(12) United States Patent
Li et al.

(10) Patent No.: US 12,340,816 B2
(45) Date of Patent: Jun. 24, 2025

(54) APPLICATION-SPECIFIC INTEGRATED CIRCUIT FOR ACCELERATING ENCODING AND DECODING, AND METHOD THEREFOR

(71) Applicant: Barrot Technology Limited, Beijing (CN)

(72) Inventors: Qiang Li, Beijing (CN); Yao Wang, Beijing (CN); Dongxiang Ye, Beijing (CN); Yong Zhu, Beijing (CN)

(73) Assignee: Barrot Technology Limited, Beijing (CN)

( * ) Notice: Subject to any disclaimer, the term of this patent is extended or adjusted under 35 U.S.C. 154(b) by 401 days.

(21) Appl. No.: 17/802,151

(22) PCT Filed: Dec. 31, 2020

(86) PCT No.: PCT/CN2020/142276
§ 371 (c)(1),
(2) Date: Feb. 7, 2023

(87) PCT Pub. No.: WO2021/169601
PCT Pub. Date: Sep. 2, 2021

(65) Prior Publication Data
US 2023/0178088 A1 Jun. 8, 2023

(30) Foreign Application Priority Data
Feb. 25, 2020 (CN) .......... 202010117764.4

(51) Int. Cl.
*G10L 19/16* (2013.01)
*G06F 18/10* (2023.01)
(Continued)

(52) U.S. Cl.
CPC ............ *G10L 19/167* (2013.01); *G06F 18/10* (2023.01); *G10L 19/0204* (2013.01); *G10L 25/18* (2013.01)

(58) Field of Classification Search
CPC .......... G06F 18/10; Y02D 30/70; H04W 4/80
See application file for complete search history.

(56) References Cited

U.S. PATENT DOCUMENTS

| 8,631,060 B2 * | 1/2014 | Reznik ............... G10L 19/0212 708/402 |
| 9,443,499 B2 * | 9/2016 | Moriyama ........... G10H 1/0066 |

(Continued)

FOREIGN PATENT DOCUMENTS

| CN | 1909382 | 2/2007 |
| CN | 101540172 | 9/2009 |
| CN | 111294782 | 6/2020 |

OTHER PUBLICATIONS

Bhagat et al. "High-throughput and compact FFT architectures using the Good-Thomas and Winograd algorithms". IET Commun., 2018, vol. 12 Iss. 8, pp. 1011-1018 (Year: 2018).*

(Continued)

*Primary Examiner* — Jesse S Pullias
(74) *Attorney, Agent, or Firm* — JCIPRNET (57) ABSTRACT

An application-specific integrated circuit for accelerated encoding and decoding and a method, which are related to the technical field of Bluetooth mobile communication. The application-specific integrated circuit for accelerated encoding and decoding includes: a hardware accelerator, wherein the hardware accelerator includes a pre-processing and pronation processing module, which performs a pre-processing and pronation processing of data, a discrete Fourier transform module is used for performing a multi-level discrete Fourier transform, in an accelerated low-delay modified discrete cosine transform operation LD-MDCT (Continued)

and/or an accelerated the low-delay inverse modified discrete cosine transform operation LD-IMDCT. The application-specific integrated circuit for accelerated encoding and decoding and a method of the present invention adopts an ASIC application-specific integrated circuit, and adopts multi-level discrete Fourier transforms, so that the complex operations are completed by the ASIC application-specific integrated circuit.

11 Claims, 10 Drawing Sheets

(51) Int. Cl.
  *G10L 19/02* (2013.01)
  *G10L 25/18* (2013.01)

(56) References Cited

U.S. PATENT DOCUMENTS

| | | | | |
|---|---|---|---|---|
| 9,478,225 | B2* | 10/2016 | Sen | H04S 3/008 |
| 10,504,530 | B2* | 12/2019 | Shi | H04N 19/179 |
| 2005/0080617 | A1* | 4/2005 | Koshy | G10L 19/0212 |
| | | | | 704/E19.02 |
| 2009/0094038 | A1* | 4/2009 | Chivukula | G06F 17/147 |
| | | | | 704/500 |
| 2011/0060433 | A1* | 3/2011 | Dai | G10L 19/16 |
| | | | | 700/94 |
| 2015/0110292 | A1* | 4/2015 | Nagel | G10L 25/18 |
| | | | | 381/98 |
| 2018/0145927 | A1* | 5/2018 | Srikanteswara | H04L 45/14 |

OTHER PUBLICATIONS

Wikipedia: "Back spinning", Dec. 13, 2016. Retrieved from "https://en.wikipedia.org/w/index.php?title=Back_spinning&oldid=513843573" (Year: 2016).*

"International Search Report (Form PCT/ISA/210) of PCT/CN2020/142276", mailed on Mar. 19, 2021, with English translation thereof, pp. 1-4.

* cited by examiner

APPLICATION-SPECIFIC INTEGRATED CIRCUIT FOR ACCELERATING ENCODING AND DECODING, AND METHOD THEREFOR

CROSS-REFERENCE TO RELATED APPLICATION

This application is a 371 application of the international PCT application serial no. PCT/CN2020/142276, filed on Dec. 31, 2020, which claims the priority benefit of China application no. 202010117764.4, filed on Feb. 25, 2020. The entirety of each of the above-mentioned patent applications is hereby incorporated by reference herein and made a part of this specification.

TECHNICAL FIELD

The present invention relates to the technical field of Bluetooth mobile communication, and in particular, to an application-specific integrated circuit for accelerated encoding and decoding and a method.

RELATED ART

With the continuous development of the field of mobile communication, the application of Bluetooth technology is becoming wider, especially in the application of Bluetooth audio such as Bluetooth music, Bluetooth audio technology is also being developed towards low power consumption, high sound quality and high performance.

Among the current conditional Bluetooth audio encoders, SBC (Sub-band coding, sub-band coding) coding technology appeared at the earliest, and is the most widely used at the same time, but the transmission efficiency is low, and the standard MP3 file loses more details in the wireless environment than in the wired environment, so its transmission quality is normal.

AAC coding technology (Advanced Audio Coding Technology) is an audio standard launched by MPEG (Motion Picture Experts Group) in conjunction with many manufacturers. This technology can achieve better sound quality, but due to the high computational complexity in the encoding and decoding process, the energy consumption of the device will also increase correspondingly, and the use of high patent licensing fees will be required. APTX series coding technology and LDAC coding technology are both private technologies at present. APTX and LDAC currently have a certain market, but due to their private nature and licensing fees when using, it affects the overall promotion of the technology.

Then the Bluetooth International Alliance and many manufacturers launched the LC3 codec technology. Since the original intention of the LC3 codec technology is to meet the audio applications in the low-power Bluetooth field, the power consumption requirements of the LC3 codec are very strict. At the same time, in the field of Bluetooth low energy consumption, many processors have very limited computing performance and storage resources, and require strong battery life. Based on the LC3 standard specification of the Bluetooth International Alliance, relevant research institutions or manufacturers can implement and optimize it. Common options include pure software optimization, software and hardware combination optimization, and pure hardware optimization. The present invention will use the combination of software and hardware to achieve optimization, so that the optimized LC3 encoding and decoding technology has better performance and longer battery life, and the development time is short, which is convenient for rapid product update.

In a word, in the development process of Bluetooth audio technology, as users' demands for high sound quality continue to increase, the amount of data processing corresponding to high sound quality increases significantly, resulting in a significant increase in the power consumption and data processing load of Bluetooth audio devices. Therefore, there is a need for a technology that can reduce the processing load and power consumption of Bluetooth audio devices while ensuring high sound quality.

SUMMARY OF INVENTION

The present invention provides an application-specific integrated circuit for accelerated encoding and decoding, which can reduce the processing load and power consumption of a Bluetooth audio device as well as ensuring high sound quality.

In one aspect of the present invention, the present invention provides an application-specific integrated circuit for accelerated encoding and decoding, comprising: a hardware accelerator, for accelerating a low-delay modified discrete cosine transform operation LD-MDCT of a first audio data during audio encoding, and/or accelerating a low-delay inverse modified discrete cosine transform operation LD-IMDCT of a second audio data during audio decoding, the hardware accelerator includes a pre-processing and pre-rotation processing module and a discrete Fourier transform module, wherein, the discrete Fourier transform module is used for performing a multi-level discrete Fourier transform of the first audio data subjected to a first pre-processing and a pronation processing by the pre-processing and pronation processing module in the accelerated low-delay modified discrete cosine transform operation LD-MDCT, and/or the multi-level discrete Fourier transform of the second audio data subjected to a second pre-processing and the pronation processing by the pre-processing and pronation processing module, in the accelerated low-delay inverse modified discrete cosine transform operation LD-IMDCT, the multi-level discrete Fourier transform includes a first-level discrete Fourier transform and a second-level discrete Fourier transform, the first-level discrete Fourier transform is a 5-point Winograd Fourier transform WFTA (Winograd Fourier Transform Algorithm), and the second-level discrete Fourier transform is one of a 2-point Winograd Fourier transform WFTA, a 4-point Winograd Fourier Transform WFTA, a 8-point Winograd Fourier Transform WFTA, a 16-point Winograd Fourier Transform WFTA, and a 32-point Winograd Fourier Transform WFTA.

In another aspect of the present invention, the present invention provides an accelerated encoding and decoding method for an application-specific integrated circuit for accelerated encoding and decoding, the application-specific integrated circuit for accelerated encoding and decoding includes a hardware accelerator, and the hardware accelerator includes a pre-processing and pronation processing module and a discrete Fourier transform module, wherein, the accelerated encoding and decoding method includes:

accelerating, by the hardware accelerator, a low-delay modified discrete cosine transform operation LD-MDCT of a first audio data during audio encoding, and/or a low-delay inverse modified discrete cosine transform operation LD-IMDCT of a second audio data during audio decoding, wherein, a multi-level discrete Fourier transform of the first audio data subjected to a first pre-processing and a pronation processing by the pre-processing and pronation processing module in the accelerated low-delay modified discrete cosine transform operation LD-MDCT by the discrete Fourier transform module, and/or the multi-level discrete Fourier transform of the second audio data subjected to a second pre-processing and the pronation processing by the pre-processing and pronation processing module, in the accelerated low-delay inverse modified discrete cosine transform operation LD-IMDCT are performed by the discrete Fourier transform module, the multi-level discrete Fourier transform includes a first-level discrete Fourier transform and a second-level discrete Fourier transform, the first-level discrete Fourier transform is a 5-point Winograd Fourier transform WFTA, and the second-level discrete Fourier transform is one of a 2-point Winograd Fourier transform WFTA, a 4-point Winograd Fourier Transform WFTA, a 8-point Winograd Fourier Transform WFTA, a 16-point Winograd Fourier Transform WFTA, and a 32-point Winograd Fourier Transform WFTA.

Effects of Invention

Compared with the solution of software programming by CPU or DSP (Digital Signal Processor) in the prior art, in the application-specific integrated circuit for accelerated encoding and decoding of the present invention, the low-delay modified discrete cosine transform operation LD-MDCT and/or the low-delay inverse modified discrete cosine transform operation LD-IMDCT is performed by an ASIC and specific multi-level discrete Fourier transforms are adopted. Since the complex operation is completed by the ASIC application-specific integrated circuit, multiple operations are performed simultaneously to speed up the operation, so that the power consumption of the Bluetooth audio device is significantly reduced, and the processing load and power consumption of the Bluetooth audio device can be reduced as well as ensuring high sound quality.

DESCRIPTION OF EMBODIMENTS

In order to make the above features and advantages of the present invention more comprehensible, the present invention will be further described in detail below with reference to the accompanying drawings and specific embodiments. The detailed description is only for helping the understanding of the present invention, and the protection scope of the present invention is not limited to the specific description in the specific embodiments.

It should be noted that the terms "first" and "second" in the claims and description of the present application are used to distinguish similar objects, and are not necessarily used to describe a specific sequence or sequence.

On basis of the existing audio coding and decoding technology, the researchers of the present invention use a multi-level discrete Fourier transform operation method for the discrete Fourier transform operation in the audio coding and decoding process, and use an application-specific integrated circuit ASIC to design an accelerated codec ASIC.

Figure 1:
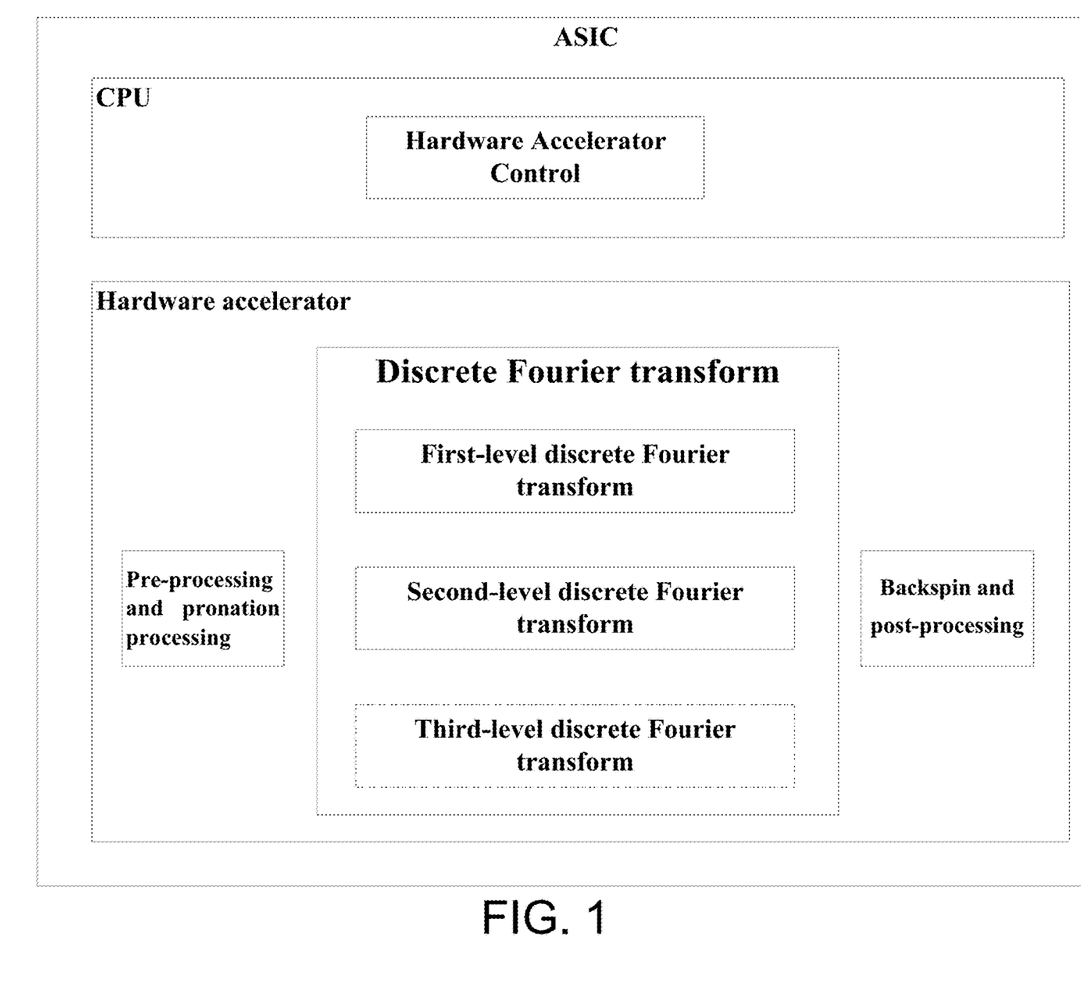
FIG. 1 is a system architecture diagram A of an application-specific integrated circuit for accelerated encoding and decoding in the present invention.
Figure 2:
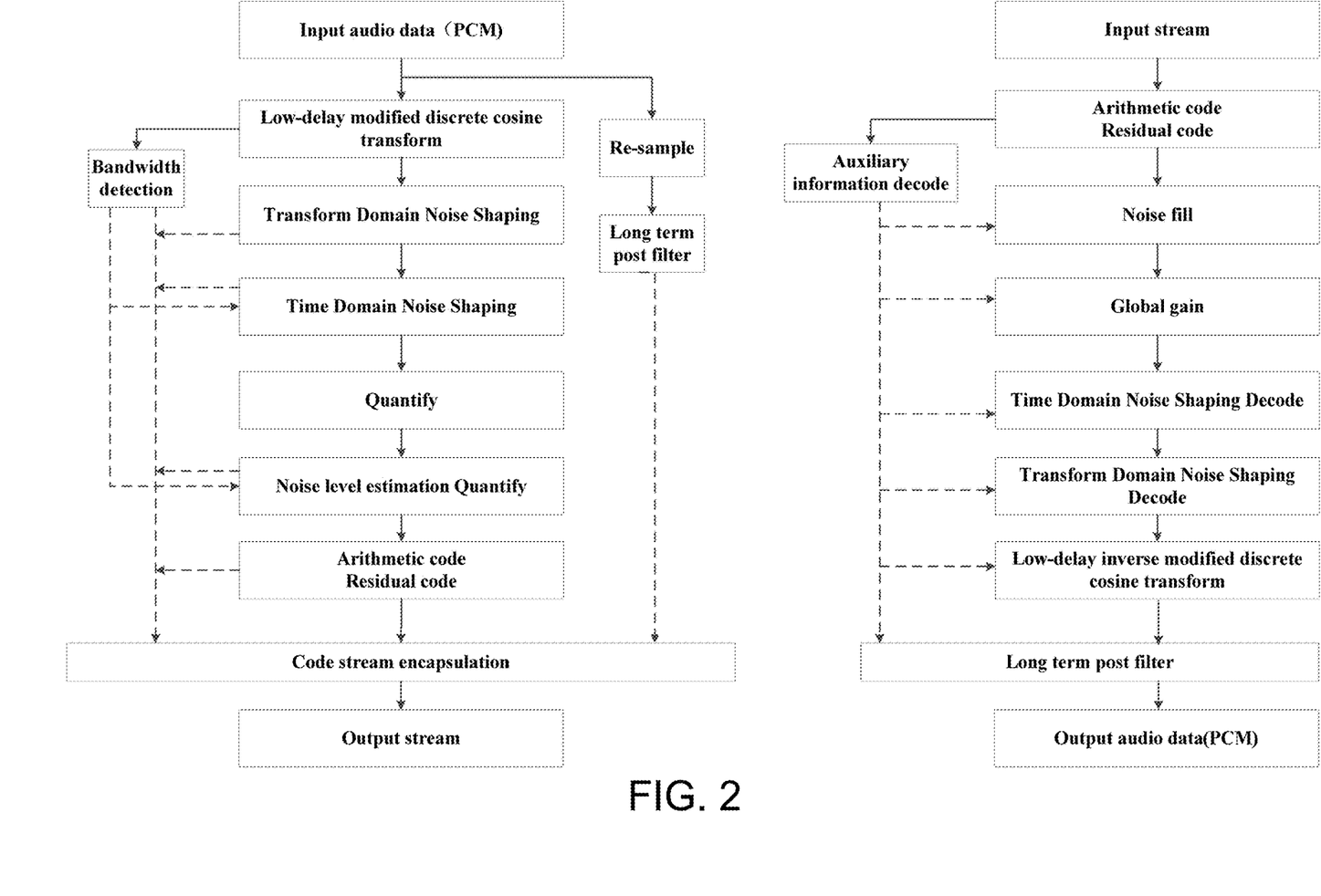
FIG. 2 is a schematic diagram of encoding and decoding in the LC3 codec.

FIG. 1 shows the architecture diagram of the main operation modules of the application-specific integrated circuit for accelerated encoding and decoding. In this specific embodiment, the application-specific integrated circuit for accelerated encoding and decoding of the present invention includes a hardware accelerator, for accelerating the low-delay modified discrete cosine transform operation LD-MDCT of a first audio data during audio encoding, and/or accelerating the low-delay inverse modified discrete cosine transform operation LD-IMDCT of a second audio data during audio decoding. The hardware accelerator includes a pre-processing and pronation processing module, a discrete Fourier transform module, and a backspin and post-processing module. As shown in FIG. 2, in an example of the present invention, the low-delay modified discrete cosine transform operation LD-MDCT and the low-delay inverse modified discrete cosine transform operation LD-IMDCT are parts in FIG. 2.

In a specific embodiment of the present invention, the pre-processing and pronation processing module performs a first pre-processing and pronation processing of the first audio data, in the low-delay modified discrete cosine transform operation LD-MDCT, and performs a second pre-processing and pronation processing of the second audio data in the low-delay inverse modified discrete cosine transform operation LD-IMDCT.

In this specific embodiment, the first pre-processing is to convert the length of the low-delay Modified Discrete Cosine Transform operation LD-MDCT sequence with a length of N into a DCT-IV operation sequence with a length of N/2, and further convert the DCT-IV operation sequence with a length of N/2 into a discrete Fourier transform DFT digital sequence with a length of N/4, and map the discrete Fourier transform DFT digital sequence with a length of N/4 to a complex number sequence. The second pre-processing performed by the pre-processing and pronation processing module of the second audio data is to map the second audio data sequence into a complex number sequence. The original long operation sequence is transformed into a shorter operation sequence, by the pre-processing, which reduces the complexity and amount of operations in the Fourier transform, speeds up the operation, and reduces the energy consumption of the operation.

In an embodiment of the present invention, the discrete Fourier transform module performs multi-level discrete Fourier transform of the first audio data subjected to the first pre-processing and pronation processing by the pre-processing and pronation processing module, in the low-delay modified discrete cosine transform operation LD-MDCT. And/or the discrete Fourier transform module performs the multi-level discrete Fourier transform of the second audio data subjected to the second pre-processing and pronation processing by the pre-processing and pronation processing module, in the accelerated low-delay inverse modified discrete cosine transform operation LD-IMDCT.

Figure 3:
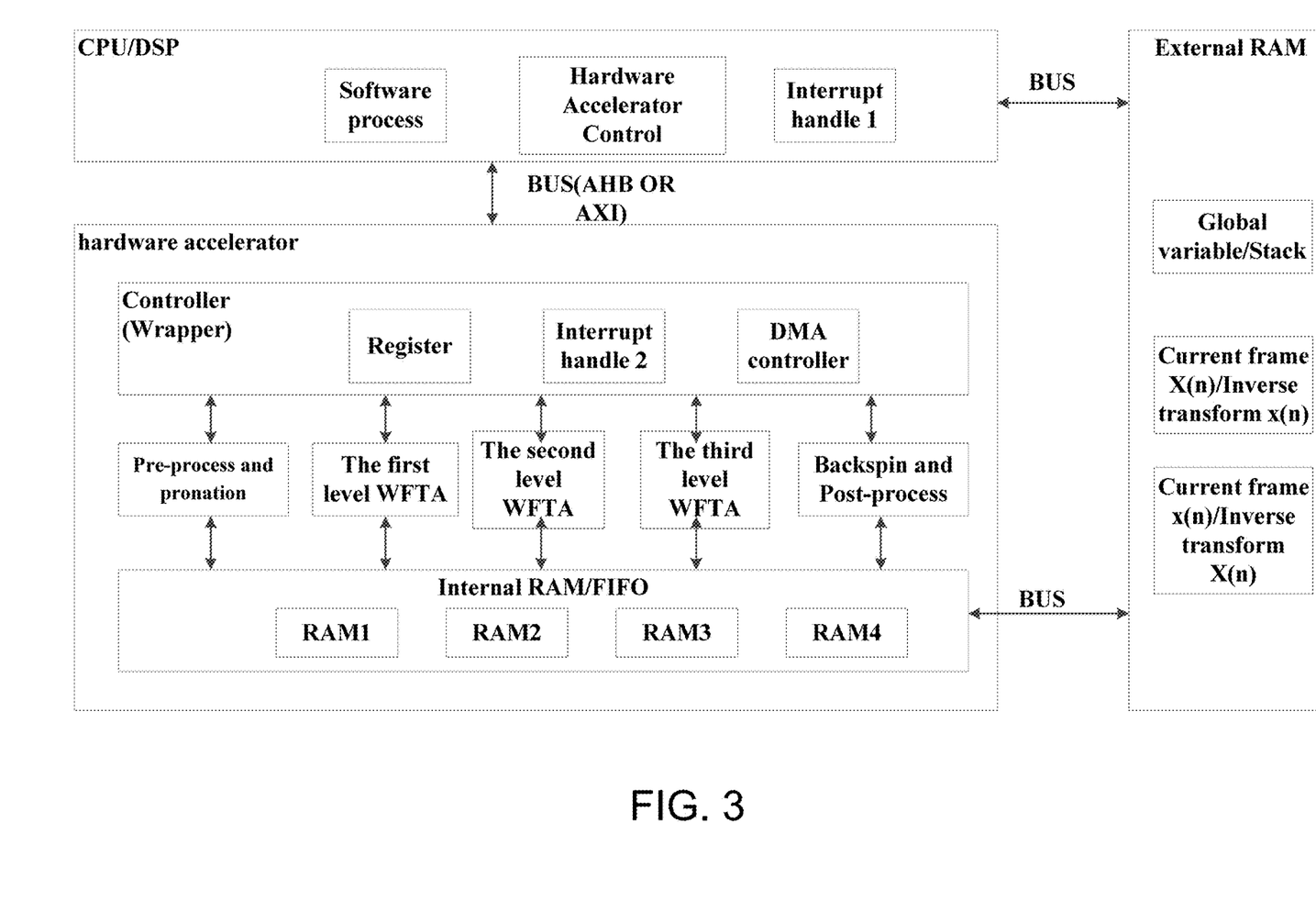
FIG. 3 is an accelerated codec system architecture diagram B of the present invention.

In an embodiment of the present invention, as shown in FIG. 1, the discrete Fourier transform module includes a first-level discrete Fourier transform, namely the first-level WFTA shown in FIG. 3, and a second-level discrete Fourier transform, namely the second-level WFTA shown in FIG. 3. Among them, the first-level discrete Fourier transform is a 5-point Winograd Fourier transform WFTA, which is the WFTA5 shown in FIG. 4, the second-level discrete Fourier transform is one of a 2-point Winograd Fourier transform WFTA, which is the WFTA2 shown in FIG. 4, a 4-point Winograd Fourier transform WFTA, which is the WFTA4 shown in FIG. 4, a 8-point Winograd Fourier transform WFTA, which is the WFTA8 shown in FIG. 4, a 16-point Winograd Fourier transform WFTA, which is the WFTA16 shown in FIG. 4, and a 32-point Winograd Fourier transform WFTA, which is the WFTA32 shown in FIG. 4.

In an embodiment of the present invention, as shown in FIG. 1, the discrete Fourier transform module further includes a third-level discrete Fourier transform, that is, the third-level WFTA shown in FIG. 3. The third-level discrete Fourier transform is a 3-point Winograd Fourier transform WFTA, which is the WFTA3 shown in FIG. 4, and a 9-point Winograd Fourier transform WFTA, which is the WFTA9 shown in FIG. 4. The order of operations of each level in the multi-level discrete Fourier transform can be exchanged.

Due to the multi-level discrete Fourier transform operation, the operation sequence is converted into the Winograd Fourier transform WFTA combination of small points, which reduces the Fourier transform operation steps, reduces the complexity, and accelerates the operation speed, thereby reducing the operation process, and the generated energy consumption.

Therein, the multiple small-point fast Fourier transforms mentioned above were derived by Dr. Winograd's application of number theory, and a new discrete Fourier transform calculation method, WFTA algorithm, was proposed. The core idea of the WFTA algorithm is to convert the DFT of small points into circular convolution, using polynomial theory to make the convolution operation have as few multiplication times as possible, and the addition operation times are almost unchanged, making the Fourier transform operation simpler. Therein, the discrete Fourier transform DFT results of 2, 3, 4, 5, 7, 8, 9 and 16 points were deduced by Dr. Winograd's application of number theory, and the fast Fourier transform of 32 points was obtained by WFTA4 and WFTA8 composition, which is calculated by using the Cooley-Tukey mixed basis algorithm.

In one embodiment of the present invention, the backspin and post-processing module performs post spin processing and a first post-processing of the first audio data subjected to the multi-level discrete Fourier transform operation, in the accelerated low-delay modified discrete cosine transform operation LD-MDCT, and/or performs post spin processing and second post-processing of the second audio data subjected to the multi-level discrete Fourier transform operation, in the accelerated low-delay inverse modified discrete cosine transform operation LD-IMDCT. The first post-processing is to output the first audio data subjected to the post spin processing, and the second post-processing is to reconstruct and output the second audio data subjected to the post spin processing.

In one embodiment of the present invention, in order to facilitate understanding, the application-specific integrated circuit for accelerated encoding and decoding and a method of the present invention combine the operation length of each part of the frame length of 10 milliseconds and the frame length of 7.5 milliseconds under different sampling rates and the Winograd algorithm The breakdown is listed in the following table for explanation:

TABLE 1

| | | | | | | | | |
|---|---|---|---|---|---|---|---|---|
| 10 ms frame length configuration and WFTA decomposition table ||||||||||
| Sampling Rate | per frame Number of samples | MDCT | DCT-IV | DFT | WFTA split | first level | second level Switch 2 | third level Switch 3 |
| 8k | 80 | 160 | 80 | 40 | 5 × 8 | WFTA5 | WFTA8 | Bypass |
| 16k | 160 | 320 | 160 | 80 | 5 × 16 | | WFTA 16 | Bypass |
| 24k | 240 | 480 | 240 | 120 | 5 × 8 × 3 | | WFTA8 | WFTA3 |
| 32k | 320 | 640 | 320 | 160 | 5 × 32 | | WFTA32 | Bypass |
| 44.1/48k | 480 | 960 | 480 | 240 | 5 × 16 × 3 | | WFTA16 | WFTA3 |

TABLE 2

7.5 ms frame length configuration and WFTA table

| Table 2: 7.5 ms frame length configuration and WFTA tableSampling Rate | per frame Number of samples | LD-MDCT | DCT-IV | DFT | WFTA split | first level | second level Switch 2 | third level Switch 3 |
|---|---|---|---|---|---|---|---|---|
| 8k | 60 | 120 | 60 | 30 | 5 × 2 × 3 | WFTA5 | WFTA2 | WFTA3 |
| 16k | 120 | 240 | 120 | 60 | 5 × 4 × 3 | | WFTA4 | WFTA3 |
| 24k | 180 | 360 | 180 | 90 | 5 × 2 × 9 | | WFTA2 | WFTA9 |
| 32k | 240 | 480 | 240 | 120 | 5 × 8 × 3 | | WFTA8 | WFTA3 |
| 44.1/48k | 360 | 720 | 360 | 180 | 5 × 4 × 9 | | WFTA4 | WFTA9 |

Table 1 will be described below. In the 10-millisecond frame length configuration and the WFTA decomposition table, the length changes of each part of the sequence of LD-MDCT, DCT-IV and DFT correspond to the pre-processing process in the pre-processing and pronation processing module above. That is, the data sequence of sequence length N is converted into an operation data sequence of N/4. Table 1 illustrates the situation of WFTA decomposition, and according to the result of the decomposed small-point product, the number of operation points in the multi-level discrete Fourier transform module is allocated. The first-level discrete Fourier transform as mentioned above is the 5-point Winograd Fourier transform WFTA5. The second-level discrete Fourier transform is one of the 2-point Winograd Fourier transform WFTA2, the 4-point Winograd Fourier transform WFTA4, the 8-point Winograd Fourier transform WFTA8, the 16-point Winograd Fourier transform WFTA16 and the 32-point Winograd Fourier transform WFTA32. The third-level discrete Fourier transform is one of the 3-point Winograd Fourier transform WFTA3 and the 9-point Winograd Fourier transform WFTA9.

It should be noted that the allocation methods shown in Table 1 and Table 2 are only a preferred allocation method, and other allocation methods are not excluded.

After the sampling rate shown in Table 1 is determined, the number of samples per frame will be determined, and then the multi-level discrete Fourier module in the application-specific integrated circuit for accelerated encoding and decoding of the present invention can be used to perform fast Fourier transform operations, during the encoding and decoding process.

Figure 4:
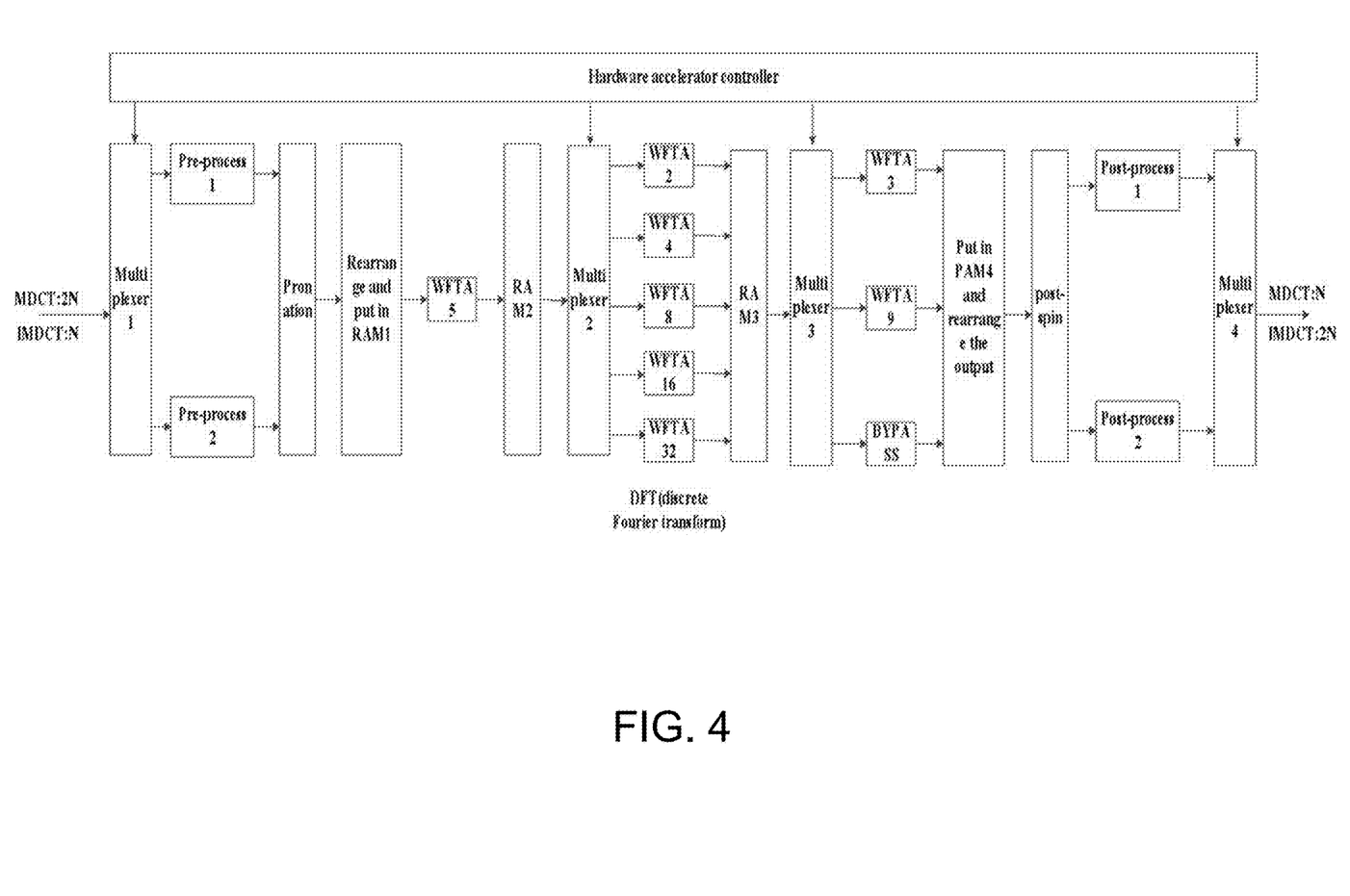
FIG. 4 is a block diagram of a hardware accelerator in the accelerated codec ASIC of the present invention.
Figure 5:
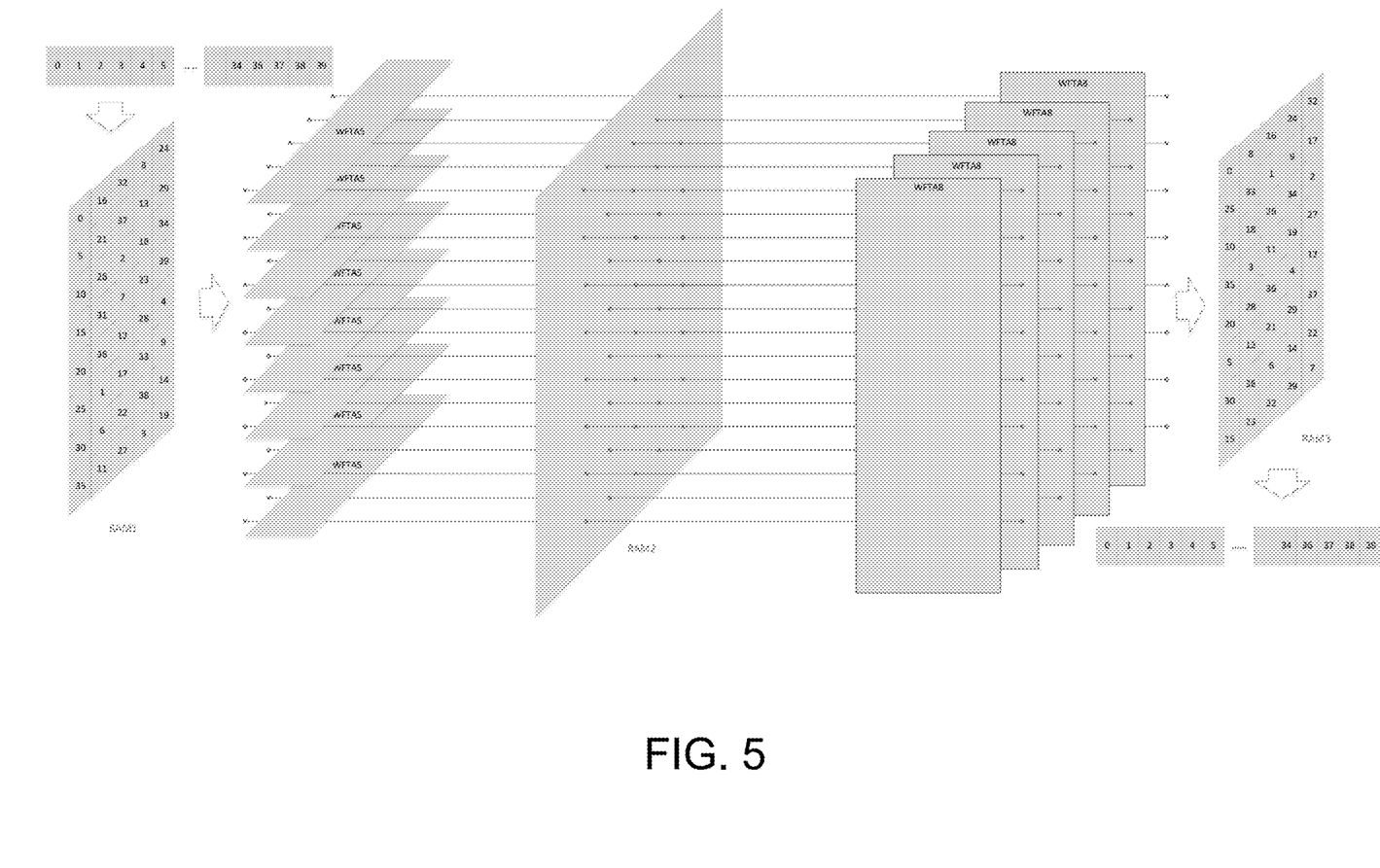
FIG. 5 is an example of a 40-point DFT with a sampling rate of 8K, namely WFTA5×WFTA8, and a schematic diagram of the working mode of the discrete Fourier transform DFT in the gray part in FIG. 4 is illustrated in a two-dimensional diagram.

In one embodiment of the present invention, in order to describe the working mode of the discrete Fourier transform DFT operation in the block diagram of the accelerator in FIG. 4, a sample rate of 8K and a 40-point DFT, i.e. WFTA5×WFTA8, are taken as an example for description, and the others are deduced in turn. Among them, FIG. 5 is a two-dimensional illustration. The in-situ operation can be performed as shown in FIG. 5, so RAM1, RAM2, and RAM3 can be multiplexed. They are three logically and one physically. In the present invention, a 15×16×4 Byte RAM can be used for implementation.

Figure 6:
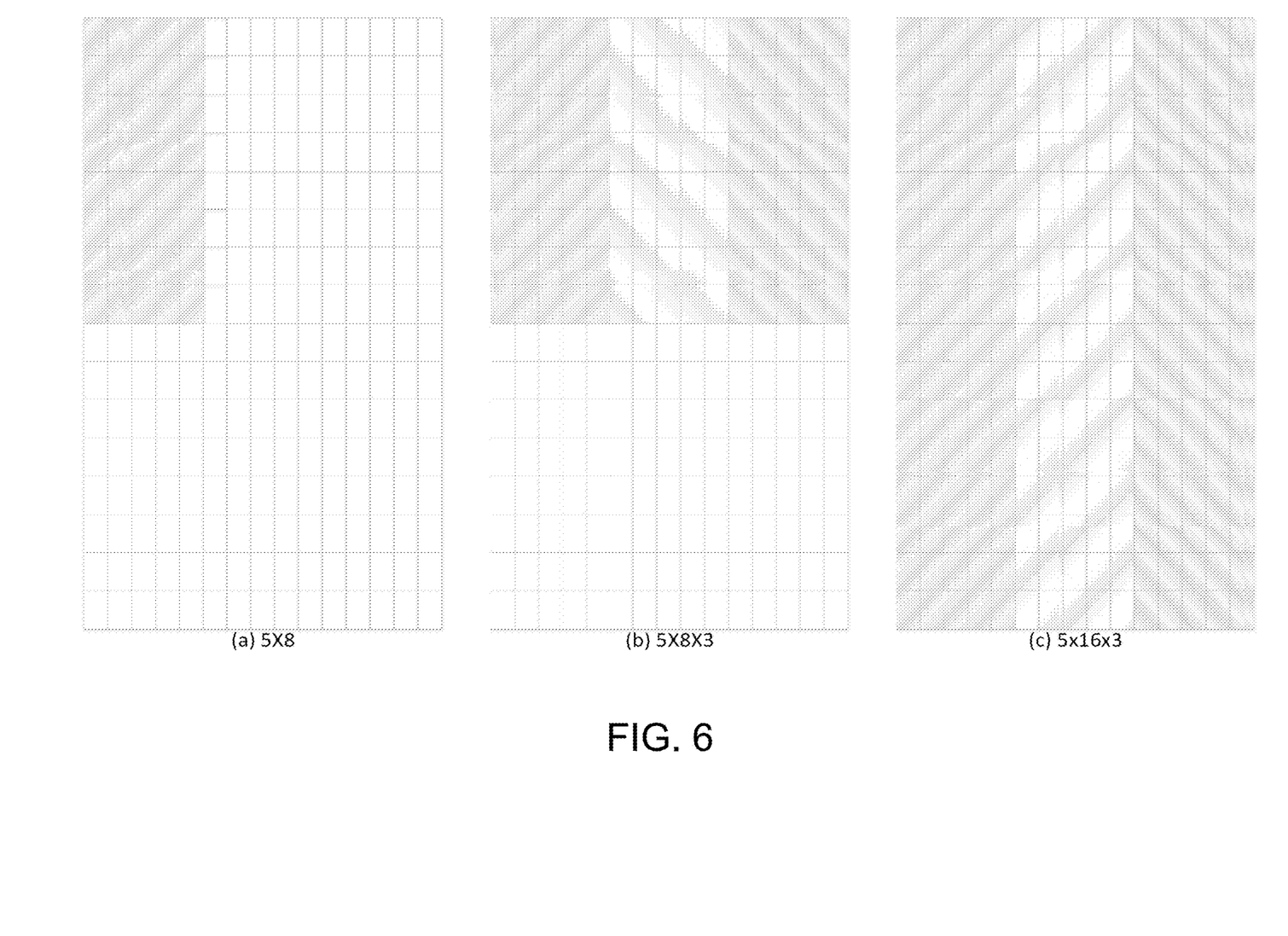
FIG. 6 is the memory schematic diagram of the internal RAM module in the accelerated codec ASIC of the present invention.

As shown in FIG. 6, where (a) WFTA5×WFTA8: use the slashed part of the RAM, (b) WFTA5×WFTA8×WFTA3: use the slashed part of the RAM, (c) WFTA5×WFTA16×WFTA3: use the slashed part RAM. In this embodiment, 4 Byte corresponds to 32-bit precision in the codec, and in actual use, it can be adjusted according to the requirements on sound quality or precision, for example, 5 Byte corresponds to 40-bit precision in the codec. 6 Byte corresponds to 48 bit precision in the codec, etc.

In an embodiment of the present invention, as shown in FIG. 3, the hardware accelerator further includes a controller module and an internal RAM module. The controller module has the functions of judging the first audio data and/or the second audio data and controlling the operation flow of the hardware accelerator. The internal RAM/FIFO module mainly plays the role of temporary data storage.

In one embodiment of the present invention, as shown in FIG. 3, the controller module includes a register, a second interrupt handler and a DMA controller. Among them, the Bluetooth devices confirm through protocol negotiation that the codec is an audio encoding process, an audio decoding process, or an audio encoding plus an audio decoding process. The local central processing unit configures the processing project of the hardware accelerator as a low-delay modified discrete cosine transform operation LD-MDCT or a low-delay inverse modified discrete cosine transform operation LD-IMDCT through registers, and then confirms that the input processing data is the first audio data or the second audio data.

In one embodiment of the present invention, after the register determines that the processing data is the first audio data, the processing procedures in the pre-processing and pronation processing module and the backspin and post-processing module are selected by the multiplexer 1 and the multiplexer 4, as shown in FIG. 4. When the processing data is the first audio data, that is, the encoding process, as shown in FIG. 4, the multiplexer 1 selects the first pre-processing process in the pre-processing and pronation processing module, and the multiplexer 4 selects the backspin and post-processing module. When the processed data is the second audio data, as shown in FIG. 4, the multiplexer 1 selects the second pre-processing process in the pre-processing and pronation processing module, and the multiplexer 4 selects the second post-processing process in the backspin and post-processing module.

In one embodiment of the present invention, the register may determine data characteristic information such as frame length and sampling rate of the first audio data and the second audio data. As shown in FIG. 4, according to different frame lengths and sampling rates, the register selects the calculation unit of the second-level discrete Fourier transform through the multiplexer 2, selects the computing unit of the third-level discrete Fourier transform through the multiplexer 4 performs the discrete Fourier transform operations corresponding to the first audio data and the second audio data.

In one embodiment of the present invention, the second interrupt processing shown in FIG. 3 mainly controls the multi-level discrete Fourier transform operation in the discrete Fourier transform module shown in FIG. 1 and FIG. 3. As shown in FIG. 3 and FIG. 4, when the first-level discrete Fourier transform, that is, the first-level WFTA, completes the fast Fourier transform operation of the first audio data and/or the second audio data, the second interrupt process generates an interrupt signal to indicate that the first-level discrete Fourier transform operation is completed, and at the same time, the second-level discrete Fourier transform, that is, the second-level WFTA, is configured and started, and the second-level discrete Fourier transform operation is performed. The second interrupt process generates an interrupt signal to indicate the completion of the second-level discrete Fourier transform operation of the first audio data and/or the second audio data by the second-level discrete Fourier transform. When the third-level discrete Fourier transform operation needs to be performed, the third-level discrete Fourier transform, ie, the third-level WFTA, is configured and activated, and the third-level discrete Fourier transform operation is performed. Because each level of WFTA processing is turned on as needed, the energy consumption caused by the simultaneous turning on of multi-level discrete Fourier transform in the discrete Fourier transform module is avoided, thereby reducing circuit power consumption.

In one embodiment of the present invention, the DMA controller as shown in FIG. 3 completes the data movement and rearrangement functions.

In an embodiment of the present invention, as shown in FIG. 3, the hardware accelerator includes an internal RAM/FIFO module, wherein the internal RAM module includes RAM1, RAM2, RAM3 and RAM4. As shown in FIG. 4, the RAM1 stores the data processed by the pre-processing and pronation processing modules and transmits the data to the first-level WFTA for operation. RAM2 stores the data after the operation of the first-level WFTA, and transmits the data to the second-level WFTA for operation. RAM3 stores the data after the operation of the second-level WFTA, and transmits the data to the third-level WFTA for operation. RAM4 stores the data after the third-level WFTA operation, and transmits the data to the next level.

Figure 7:
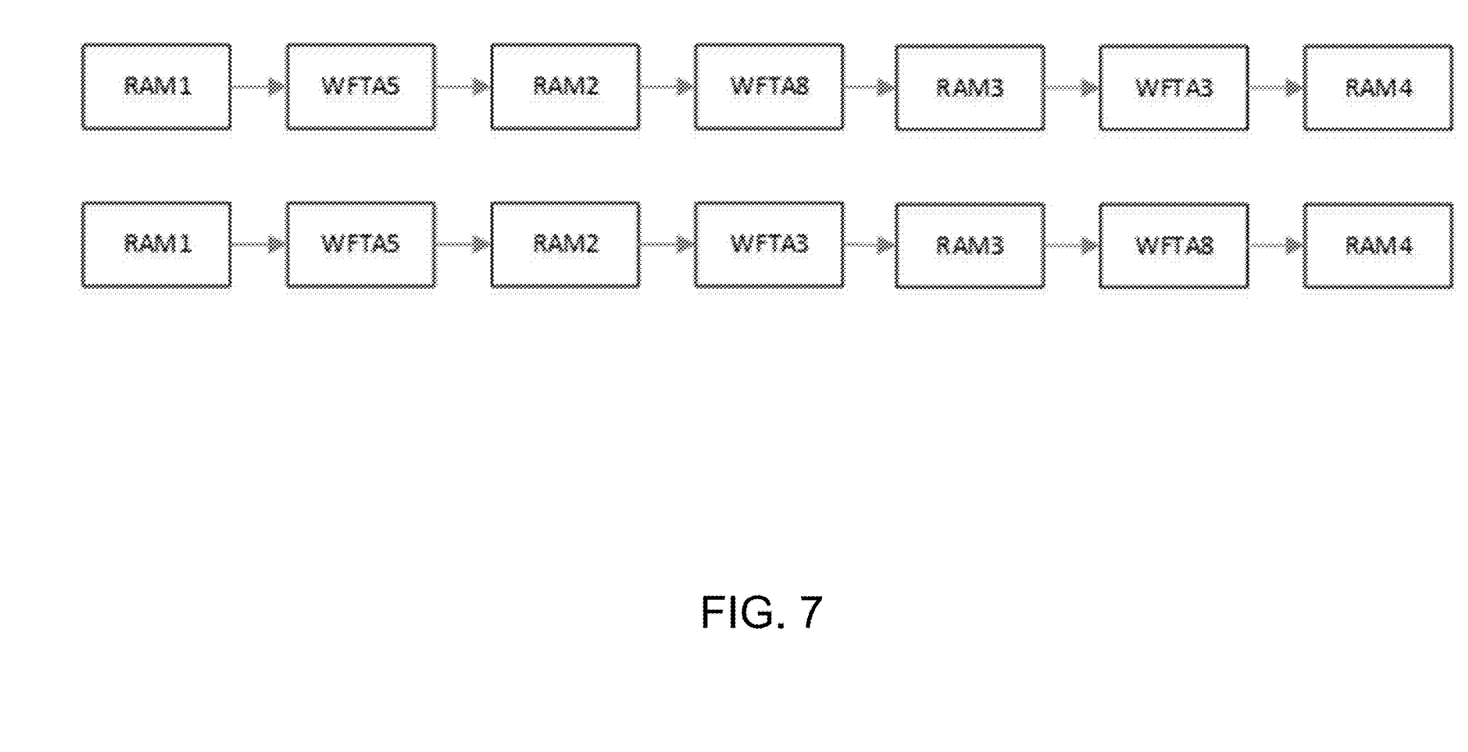
FIG. 7 is an example of a DFT with a frame length of 7.5 milliseconds and a sampling rate of 32k, and two other representations of its operational block diagram.

In an embodiment of the present invention, it is mentioned above that in the multi-level discrete Fourier transform operation, the operation order between the levels can be exchanged. In an example of the present invention, taking a DFT with a frame length of 7.5 milliseconds and a sampling rate of 32k as an example, there are 6 combinations of its operations, two of which are shown in FIG. 7.

In one embodiment of the present invention, the application-specific integrated circuit for accelerated encoding and decoding of the present invention includes a CPU, as shown in FIG. 1 or FIG. 3. The CPU includes a hardware accelerator control module. The hardware accelerator control module sends a control signal to the hardware accelerator, and the control signal controls the hardware accelerator to be configured and started up, so that the hardware accelerator can perform accelerated low-delay modified discrete cosine transform operations LD-MDCT and/or accelerated low-delay inverse modified discrete cosine transform operations LD-IMDCT. The CPU receives an indication signal fed back by the hardware accelerator for indicating that the accelerated low-delay modified discrete cosine transform operation LD-MDCT and/or the accelerated low-delay inverse modified discrete cosine transform operation LD-IMDCT has been completed.

In an embodiment of the present invention, as shown in FIG. 3, in addition to the hardware accelerator control, the CPU/DSP also includes a first interrupt processing module. When the hardware accelerator finishes processing one frame of the first audio data and/or the second audio data, the first interrupt processing module generates an interrupt signal, which represents the completion of the operation of one frame of the first audio data and/or the second audio data in the hardware accelerator, at the same time, set the corresponding flag bit.

In one embodiment of the present invention, as shown in FIG. 3, the CPU/DSP further includes a software processing module, for performing other software processing, except for the low-delay Modified Discrete Cosine Transform LD-MDCT and/or the low-delay inverse modified discrete cosine transform operation LD-IMDCT. During the encoding process, when the hardware accelerator is started, the CPU/DSP starts to resample and LTPF (Long Term Post Filtering) the first audio data of the current frame. After the hardware accelerator finishes processing one frame of the first audio data, the software processing module queries the end flag of the first interrupt processing module, and performs subsequent encoding work on the one frame of the first audio data subjected to the low-delay Modified Discrete Cosine Transform LD-MDCT operation. In the audio decoding process, the software processing module will process the second audio data before the hardware accelerator data processing. And the process includes code stream analysis, noise filling, global gain, TNS (Temporal Noise Shaping) decoding and SNS (Spectral Noise Shaping) decoding, and finally the spectral coefficients are obtained. After the hardware accelerator processes the data, the second audio data after the operation is LTPF processed and scaled and output. The software processing part is not the gist of the present invention, and only the main functions are described here.

In one example of the present invention, the first audio data is a frame of pulse code modulation (PCM) data, and the second audio data is a frame of spectral coefficients.

Figure 8:
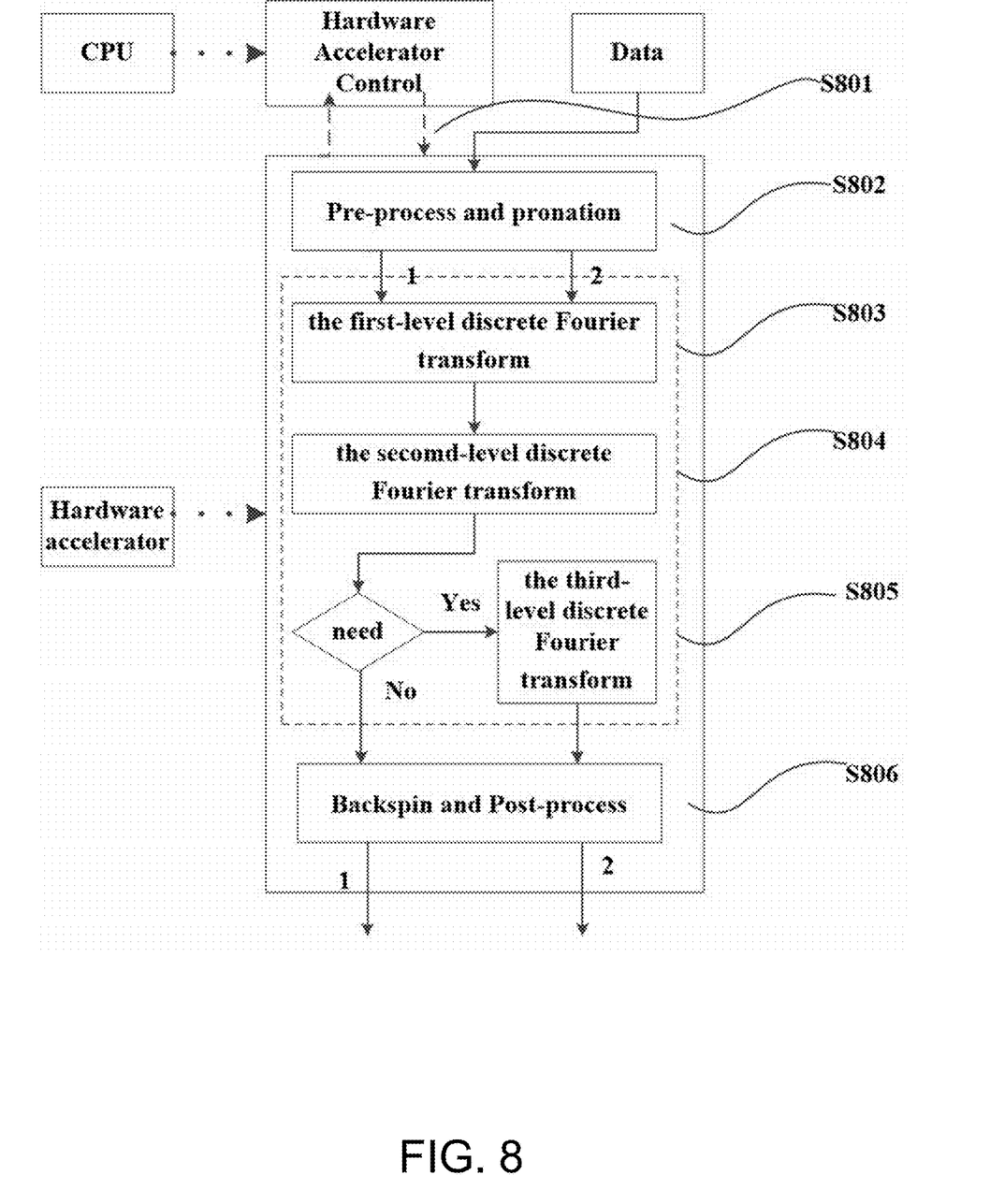
FIG. 8 is a flow chart of a specific implementation manner of the accelerated encoding and decoding method of the present invention.

In one embodiment of the present invention, as shown in FIG. 8, the accelerated encoding and decoding method of the ASIC for accelerated coding and decoding of the present invention includes the following steps:

Step S801 is the step of configuring and starting up the hardware accelerator for the CPU to control, in this step, the hardware accelerator control module in the CPU configures and starts up the hardware accelerator when the hardware accelerator receives processing data. When the first-level discrete Fourier transform operation ends, the hardware accelerator control module configures and starts up the second-level discrete Fourier transform. When the third-level discrete Fourier transform operation needs to be performed, the hardware accelerator control module configures and starts up the third-level discrete Fourier transform when the second-level discrete Fourier transform operation ends.

Step S802 is the data processing step of the pre-processing and pronation processing module. In this step, the pre-processing and pronation processing module performs first pre-processing and pronation operations of the first audio data in the encoding process. And the pre-processing and pronation processing module performs second pre-processing and pronation processing of the second audio data in the decoding process. As shown in FIG. 4, the multiplexer 1 selects different processing procedures of the first pre-processing and the second pre-processing. When the processing data is the first audio data, the register configuration multiplexer 1 as shown in FIG. 3 performs the first pre-processing of the first audio data. When the processing data is the second audio data, the register shown in FIG. 3, the multiplexer 1 is configured to perform a second pre-processing of the first audio data.

Step S803 is the first-level discrete Fourier transform operation step. In this step, the discrete Fourier transform module in the hardware accelerator performs the first-level discrete Fourier transform operation on the pre-processed and pronated data information. As shown in FIG. 4, the 5-point Winograd Fourier transform WFTA5 operation is performed.

Step S804 is the second-level discrete Fourier transform operation step. In this step, the discrete Fourier transform module in the hardware accelerator performs the second-level discrete Fourier transform operation on the data information that has undergone the first-level discrete Fourier transform operation. As shown in FIG. 4, that is, one of the 2-point Winograd Fourier transform WFTA2 operation, the 4-point Winograd Fourier transform WFTA4 operation, the 8-point Winograd Fourier transform WFTA8 operation, the 16-point Winograd Fourier transform WFTA16 operation, and the 32-point Winograd Fourier Transform WFTA32 operation is performed. As shown in FIG. 4, the selection of the small-point fast Fourier transform in the second-level discrete Fourier transform is performed by the multiplexer 2, wherein the multiplexer 2 is selected by the register shown in FIG. 3 according to the frame length of the processing data, the sampling rate and other data characteristics configure the selection of the multiplexer 2.

Step S805 is a third-level discrete Fourier transform operation step. In this step, the discrete Fourier transform module in the hardware accelerator performs a third-level discrete Fourier transform on the data information that has undergone the second-level discrete Fourier transform operation. As shown in FIG. 4, that is, one of the 3-point Winograd Fourier transform WFTA3 operation and the 9-point Winograd Fourier transform WFTA9 operation is performed. As shown in FIG. 4, the selection of the small-point fast Fourier transform in the third-level discrete Fourier transform is selected by the multiplexer 3. The selection of the multiplexer 3 is configured by the register shown in FIG. 3 according to the data characteristics such as the frame length and the sampling rate of the processed data. It should be noted here that the third-level discrete Fourier transform operation step is not a necessary step, and is selected according to the specific processing data.

Step S806 is the data processing step of the backspin and post-processing module. In this step, backspin and post-processing module performs the first post-processing and post spin processing of the first audio data in the encoding process, and performs the second post-processing and post spin processing operation of the second audio data in the decoding process. As shown in FIG. 4, the multiplexer 4 selects different processing procedures of the first post-processing and the second post-processing. When the processing data is the first audio data, the register configuration multiplexer 4 as shown in FIG. 3 performs the first post-processing of the first audio data. When the processing data is the second audio data, the register shown in FIG. 3, the multiplexer 4 is configured to perform a second post-processing of the second audio data.

Figure 9:
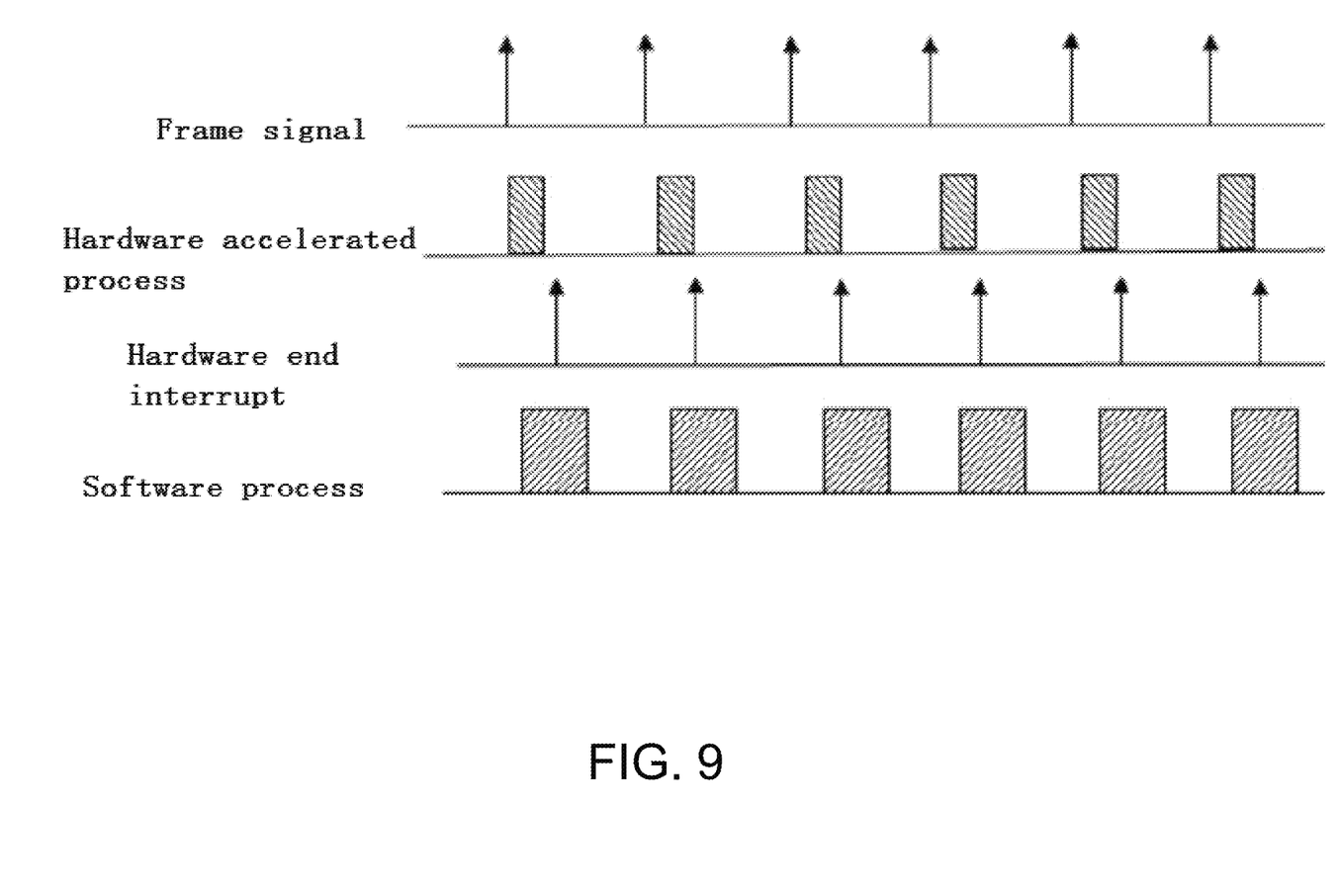
FIG. 9 is a schematic diagram of an encoding timing sequence of an ASIC for accelerated encoding and decoding of the present invention.
Figure 10:
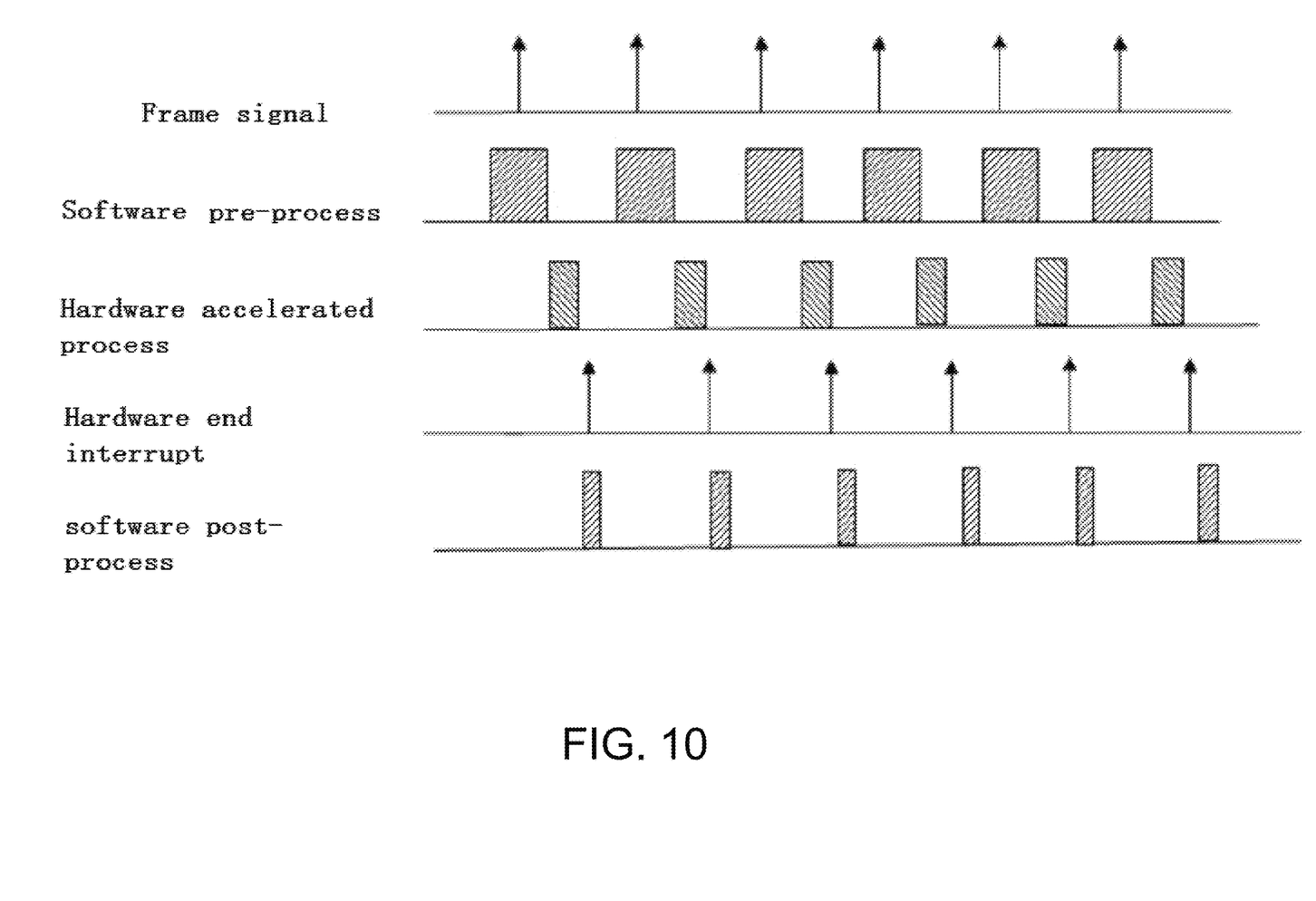
FIG. 10 is a schematic diagram of the decoding timing of the accelerated coding and decoding ASIC of the present invention.

In an embodiment of the present invention, in order to have a clearer understanding of the encoding and decoding process of the encoding and decoding circuit, the following briefly describes the encoding and decoding sequence diagram with reference to FIG. 9 and FIG. 10. Wherein FIG. 9 is the coding timing diagram of the accelerated coding and decoding ASIC of the present invention, wherein:

1) Frame signal: it indicates that a frame of the first audio data, that is, a frame of PCM data, is ready,
2) Hardware accelerated processing: The hardware accelerator processes one frame of data. In this process, first configure the hardware accelerator, and then start the hardware accelerator,
3) Hardware end interrupt: The MDCT accelerator generates an interrupt to indicate the end of a frame of data processing, and the central processing unit CPU/DSP will enter the interrupt service routine ISR for processing and set the corresponding flag, and
4) Software processing:
   a) After the hardware accelerator is started, the central processing unit CPU/DSP starts resampling and LTPF processing, and
   b) Query the end flag of MDCT (usually this flag will be set before the end of LTPF), and then perform subsequent encoding operations.

FIG. 10 is the decoding timing diagram of the accelerated coding and decoding ASIC of the present invention, wherein:

1) Frame signal: it Indicates that a frame of code stream data is ready,
2) Software pre-processing: mainly includes code stream analysis, noise filling, global gain, TNS decoding and SNS decoding, and finally obtains the spectral coefficients, that is, the second audio data,
3) Hardware acceleration processing: The CPU/DSP configures and starts the hardware accelerator, and then the MDCT hardware accelerator processes a frame of data,
4) Hardware end interrupt: The MDCT accelerator generates an interrupt to indicate the end of a frame of data processing, and the CPU/DSP will enter the ISR for processing and set relevant flags, and
5) Software post-processing: it performs LTPF processing, scaling and outputting of a frame of data output by MDCT.

It can be known from FIG. 9 and its description that the hardware accelerator and software processing can be processed in parallel, which reduces the CPU/DSP frequency requirement, and further makes software integration simpler.

Based on the above description, the present invention adopts a new DFT calculation method WFTA algorithm proposed by Dr. Winograd in 1975 to perform the Winograd Fourier transform operation. In order to reduce the operation steps and speed up the operation speed, the design of the special integrated circuit ASIC circuit is adopted to reduce the power consumption of the audio codec and prolong the battery life of the Bluetooth device. In addition, the accelerated codec special integrated circuit of the present invention can run the software processing part at the same time while the hardware accelerator is performing operations, which reduces the main frequency requirement of the CPU/DSP and makes the software integration simpler.

What is claimed is:

1. An application-specific integrated circuit for accelerated encoding and decoding, comprising:
a hardware accelerator, for accelerating a low-delay modified discrete cosine transform operation LD-MDCT of a first audio data during audio encoding, and/or accelerating a low-delay inverse modified discrete cosine transform operation LD-IMDCT of a second audio data during audio decoding, the hardware accelerator includes a pre-processing and pronation processing module and a discrete Fourier transform module, wherein the hardware accelerator further comprises:
a backspin and post-processing module, for performing a post spin processing and a first post-processing of the first audio data, in the accelerated low-delay modified discrete cosine transform operation LD-MDCT, and/or performing the post spin processing and a second post-processing of the second audio data, in the accelerated low-delay inverse modified discrete cosine transform operation LD-IMDCT, wherein the first post-processing is to output the first audio data subjected to the post spin processing, and the second post-processing is to reconstruct and output the second audio data subjected to the post spin processing, wherein,
the discrete Fourier transform module is used for performing a multi-level discrete Fourier transform of the first audio data subjected to a first pre-processing and a pronation processing by the pre-processing and pronation processing module in the accelerated low-delay modified discrete cosine transform operation LD-MDCT, and/or the multi-level discrete Fourier transform of the second audio data subjected to a second pre-processing and the pronation processing by the pre-processing and pronation processing module, in the accelerated low-delay inverse modified discrete cosine transform operation LD-IMDCT, the multi-level discrete Fourier transform includes a first-level discrete Fourier transform and a second-level discrete Fourier transform, the first-level discrete Fourier transform is a 5-point Winograd Fourier transform WFTA, and the second-level discrete Fourier transform is one of a 2-point Winograd Fourier transform WFTA, a 4-point Winograd Fourier Transform WFTA, a 8-point Winograd Fourier Transform WFTA, a 16-point Winograd Fourier Transform WFTA, and a 32-point Winograd Fourier Transform WFTA, wherein the order of each level of operations in the multi-level discrete Fourier transform is arbitrarily exchanged according to operation requirements.

2. The application-specific integrated circuit for accelerated encoding and decoding according to claim 1, wherein the multi-level discrete Fourier transform further comprises:
a third-level discrete Fourier transform, which is one of a 3-point Winograd Fourier transform WFTA and a 9-point Winograd Fourier transform WFTA.

3. The application-specific integrated circuit for accelerated encoding and decoding according to claim 1, wherein the first pre-processing performed by the pre-processing and pronation processing module of the first audio data is to convert the low-delay modified discrete cosine transform operation LD-MDCT with a length of N into a DCT-IV operation sequence with a length of N/2, in the low-delay modified discrete cosine transform operation LD-MDCT, to further convert the DCT-IV operation sequence with a length of N/2 into a discrete Fourier transform DFT digital sequence with a length of N/4, and to map the discrete Fourier transform DFT digital sequence with a length of N/4 to a complex number sequence; and the second pre-processing performed by the pre-processing and pronation processing module of the second audio data is to map a second audio data sequence into a complex number sequence, in the low-delay inverse modified discrete cosine transform operation LD-IMDCT.

4. The application-specific integrated circuit for accelerated encoding and decoding according to claim 1, wherein the application-specific integrated circuit for accelerated encoding and decoding further comprises:

a CPU, for sending a control signal to the hardware accelerator, wherein the control signal controls the hardware accelerator to be configured and started up, so that the hardware accelerator performs the accelerated low-delay modified discrete cosine transform operation LD-MDCT and/or the accelerated low-delay inverse modified discrete cosine transform operation LD-IMDCT, and the CPU receives an instruction signal fed back by the hardware accelerator for instructing that the accelerated low-delay modified discrete cosine transform operation LD-MDCT and/or the accelerated low-delay inverse modified discrete cosine transform operation LD-IMDCT has been completed.

5. The application-specific integrated circuit for accelerated encoding and decoding according to claim 4, wherein the CPU comprises:
a hardware accelerator control module, for generating the control signal when the hardware accelerator receives the first audio data and/or the second audio data, wherein the hardware accelerator control module includes a register, and the register judges processing data, and selects a processing process of the backspin and post-processing module and the pre-processing and pronation processing module through a plurality of multi-way switches, the hardware accelerator control module further includes a second interrupt processing to control operations of all levels in the multi-level discrete Fourier transform.

6. The application-specific integrated circuit for accelerated encoding and decoding according to claim 1, wherein, the first audio data is a frame of pulse code modulation (PCM) data, and the second audio data is a frame of spectral coefficients.

7. An accelerated encoding and decoding method for an application-specific integrated circuit for accelerated encoding and decoding, wherein the application-specific integrated circuit for accelerated encoding and decoding includes a hardware accelerator, and the hardware accelerator includes a pre-processing and pronation processing module, a discrete Fourier transform module and a backspin and post-processing module, wherein, the accelerated encoding and decoding method includes:
accelerating, by the hardware accelerator, a low-delay modified discrete cosine transform operation LD-MDCT of a first audio data during audio encoding, and/or a low-delay inverse modified discrete cosine transform operation LD-IMDCT of a second audio data during audio decoding, and
performing a post spin processing and a first post-processing of the first audio data by the backspin and post-processing module in the accelerated low-delay modified discrete cosine transform operation LD-MDCT, and/or performing a post spin processing and a second post-processing of the second audio data by the backspin and post-processing module in the accelerated low-delay inverse modified discrete cosine transform operation LD-IMDCT, wherein the first post-processing is to output the first audio data subjected to the post spin processing, and the second post-processing is to reconstruct and output the second audio data subjected to the post spin processing, wherein,
a multi-level discrete Fourier transform of the first audio data subjected to a first pre-processing and a pronation processing by the pre-processing and pronation processing module in the accelerated low-delay modified discrete cosine transform operation LD-MDCT, and/or the multi-level discrete Fourier transform of the second audio data subjected to a second pre-processing and the pronation processing by the pre-processing and pronation processing module, in the accelerated low-delay inverse modified discrete cosine transform operation LD-IMDCT are performed by the discrete Fourier transform module, the multi-level discrete Fourier transform includes a first-level discrete Fourier transform and a second-level discrete Fourier transform, the first-level discrete Fourier transform is a 5-point Winograd Fourier transform WFTA, and the second-level discrete Fourier transform is one of a 2-point Winograd Fourier transform WFTA, a 4-point Winograd Fourier Transform WFTA, a 8-point Winograd Fourier Transform WFTA, a 16-point Winograd Fourier Transform WFTA, and a 32-point Winograd Fourier Transform WFTA, wherein, the order of each level of operations in the multi-level discrete Fourier transform is arbitrarily exchanged according to operation requirements.

8. The accelerated encoding and decoding method according to claim 7, wherein the multi-level discrete Fourier transform further comprises:
a third-level discrete Fourier transform, which is one of a 3-point Winograd Fourier transform WFTA and a 9-point Winograd Fourier transform WFTA.

9. The accelerated encoding and decoding method according to claim 7, wherein the application-specific integrated circuit for accelerated encoding and decoding further comprises a CPU, and the accelerated encoding and decoding method further comprises:

sending, by the CPU, a control signal to the hardware accelerator, wherein the control signal controls the hardware accelerator to be configured and started up, so that the hardware accelerator performs the accelerated low-delay modified discrete cosine transform operation LD-MDCT and/or the accelerated low-delay inverse modified discrete cosine transform operation LD-IMDCT, and receiving, by the CPU, an indication signal fed back by the hardware accelerator for indicating the accelerated low-delay modified discrete cosine transform operation LD-MDCT and/or the accelerated low-delay inverse modified discrete cosine transform operation LD-IMDCT has been completed.

10. The accelerated encoding and decoding method according to claim 9, wherein the CPU comprises a hardware accelerator control module, and the accelerated encoding and decoding method further comprises:
generating the control signal by the hardware accelerator control module in the case that the hardware accelerator receives the first audio data and/or the second audio data.

11. The accelerated encoding and decoding method according to claim 7, wherein,
the first audio data is a frame of pulse code modulation (PCM) data, and the second audio data is a frame of spectral coefficients.

\* \* \* \* \*